United States Patent Office 3,639,477
Patented Feb. 1, 1972

3,639,477
NOVEL PROPOXYGUANIDINE COMPOUNDS AND MEANS OF PRODUCING THE SAME
Yvon J. L'Italien, Plymouth, Mich., assignor to Parke, Davis & Company, Detroit, Mich.
No Drawing. Continuation-in-part of application Ser. No. 420,439, Dec. 22, 1964. This application June 17, 1968, Ser. No. 737,286
Int. Cl. C07c *129/00*
U.S. Cl. 260—564 A
3 Claims

ABSTRACT OF THE DISCLOSURE

The novel free base 3 - (p - fluorophenoxy)propoxyguanidine and its acid salts are prepared by reacting 3-(p-fluorophenoxy)propoxyamine with an acid addition salt of a reactive guanidine compound Z—C(NH$_2$)=NH, where Z is an alkoxy or alkyl thio group or a triazolyl group or similar heterocyclic displaceable group. The products are pharmacological agents having anoretic and depressant properties.

SUMMARY AND DETAILED DESCRIPTION

This application is a continuation-in-part of my copending application Ser. No. 420,439 filed Dec. 22, 1964 now abandoned.

This invention relates to novel chemical compounds having useful pharmacological properties, to process means for their production, and to pharmaceutical compositions embodying such chemical compounds and use thereof. More particularly, this invention relates to 3-(p-fluorophenoxy)propoxyguanidine and acid addition salts thereof.

According to the invention, the new phenoxyalkoxyguanidines are produced by reacting 3-(p-fluorophenoxy)-propoxyamine with an acid addition salt of a reactive guanidine compound having the structure:

$$Z—C(NH_2)=NH$$

where Z is a displaceable group such as an alkoxy group (e.g., methoxy, ethoxy), an alkylthio group (methylthio, ethylthio), or an unsubstituted or mono- or poly-substituted unsaturated nitrogen heterocyclic group containing at least two nuclear nitrogen atoms one of which is attached directly to the guanidine carbon atom (e.g., pyrazolyl, 3,5-dimethylpyrazolyl, 3-methyl-5-phenylpyrazolyl, imidazolyl, triazolyl, or tetrazolyl). The reaction is carried out either with no solvent or in the presence of an unreactive solvent such as water, an alcohol, chlorobenzene, dimethylformamide, or a mixture of two or more such solvents. The preferred solvent is water or a mixture of ethanol and water. In general, the reactants are used in equimolar amounts but if desired a slight excess of either reactant may be used. The reaction is usually carried out at temperatures in the approximate range from 20 to 150° C. Reflux conditions are preferred. At reflux the reaction is usually complete within four to 24 hours. The product is isolated directly as the acid addition salt corresponding to that of the guanidine reactant or, if desired, as the free base (or as another salt with a different acid) obtained by neutralizing the salt or by other conventional means such as ion exchange.

The 3-(p-fluorophenoxy)propoxyguanidine free base compound of the invention forms acid addition salts upon reaction with organic and inorganic acids. Some examples of these salts are the inorganic acid salts such as the hydrochloride, hydrobromide, hydroiodide, sulfate and phosphate; the organic acid salts such as the carbonate, succinate, benzoate, acetate, citrate, malate, maleate, p-toluenesulfonate, gluconate, ascorbate, benzene-sulfonate, and sulfamate; and complexes with acidic ion exchange resins. The acid addition salts are conveniently formed from the free base by mixing the free base with at least an equivalent amount of the acid in a solvent in which the salt is insoluble, particularly after chilling, thereby permitting recovery of the desired salt as a solid phase. Whereas, both the free base and salt forms are useful for the purposes of the invention, the salts are generally preferred in those cases where increased stability and water solubility are desirable. The invention contemplates the acid salts broadly. Those salts which are unsuited to particular uses, as for example uses where toxicity is a problem, are nevertheless useful as intermediates, being readily convertible to non-toxic acid salts by means which per se are familiar in the art.

The 3-(p-fluorophenoxy)propoxyguanidine free base and acid salt products of the invention are useful as pharmacological agents and especially as anoretic agents which may be administered parenterally or, more preferably, orally. The products also generally depress the autonomic nervous system. Their activity in these respects is demonstrable and quantitatively measurable by tests which in the art have been found to reliably indicate the activity of standard clinically useful agents of the type. For example, by an art-recognized test procedure using rats as subjects the product in water-soluble (nitrate) salt form inhibits consumption of food and water. In this test the substance is administered to rats intraperitoneally before feeding. Prior to such administration solid food is withheld from the rats for 16–24 hours but they have free access to water. The amounts of food and water consumed by the animals with and without administration of the test substance are then measured at the end of 1, 2 and 5 hours. From these measurements the percentage inhibition of consumption in relation to the control animals is calculated. The mentioned product typically inhibits the consumption of food and water by 41–60% after the first hour in comparison to the controls without causing behavioral signs such as stimulation, depression, ataxia, ptosis, salivation or other side effects or toxic effects.

Also, by another art-recognized test procedure using dogs as subjects (Arch. Int. Pharm. Ther., 96, 291) the product in water-soluble (nitrate) salt form serves to depress the autonomic nervous system when administered by the intravenous route at each dose in the series 2, 4, 8 and 16 mg./kg. The products exhibit such depressant and anoretic activity at well-tolerated levels; hence, as indicated, the products have application as anoretic agents, as depressants, etc., for administration by the oral or parenteral routes.

The present invention also contemplates the provision of pharmaceutical compositions in dosage unit form for use as therapeutic agents in which one or more of the products is constituted as an active ingredient together with carriers or diluents. Solid carriers and diluents are particularly suitable and include sugars such as lactose and sucrose; cellulose derivatives such as sodium carboxymethyl cellulose, ethyl cellulose, methyl cellulose and cellulose acetate phthalate; gelatin (including hard and soft shell capsules); talc, corn starch, stearic acid and magnesium stearate. Liquid carriers and diluents suitable for use include vegetable oils such as peanut oil, cottonseed oil, sesame oil, olive oil, corn oil and oil of theobroma; polyethylene glycol; propylene glycol; glycerine, sorbitol; ethanol; and water. Suitable preservatives and flavoring agents can also be incorporated in such compositions. In the production of dosage forms such as tablets, an enteric coating or sugar coating can be applied to make the medicament more palatable. If administration by the parenteral route is desired, the composition can be formulated in ampoule form as a suspension or solution in a liquid diluent. Other therapeutic agents can also be incorporated with the compositions.

The invention is illustrated by the following examples.

EXAMPLE 1

(a) 3-phenoxypropoxyamine (0.033 mole) is added to a solution of 3,5-dimethyl-1-guanylpyrazole nitrate (6.7 g.) in 25 ml. of water. The mixture is heated at reflux for 20 hours, and the mixture is cooled, washed with ether and the resulting aqueous solution evaporated to dryness at reduced pressure. The residual product is 3-phenoxypropoxyguanidine nitrate, M.P. 115–116° C. after crystallization from isopropanol-ether. The free base, 3-phenoxypropoxyguanidine, is prepared by dissolving the nitrate salt in water and making the solution basic with aqueous sodium bicarbonate, whereby the free base precipitates as a solid and is obtained in crystalline form after collection, washing with water and drying.

(b) The following is an illustrative procedure for the preparation of 3-phenoxypropoxyamine:

3-phenoxypropyl bromide (43 g., 0.20 mole) and triethylamine (20.2 g., 0.20 mole) are added to a solution of N-hydroxyphthalimide (32.6 g., 0.20 mole) in 240 ml. of dimethylformamide. The resulting solution is allowed to stand at room temperature for 48 hours and is then filtered. The filtrate is diluted with 3 volumes of water. The N-(3-phenoxypropoxy)phthalimide separates out and is collected and recrystallized from a minimum amount of methanol; M.P. 58–59° C. Hydrazine hydrate (85% aqueous, 16.5 g., 0.28 mole) is added to a solution of N-(3-phenoxypropoxy)phthalimide (40.2 g., 0.14 mole) in 240 ml. of methanol and 40 ml. of dimethylformamide at 60° C. The mixture is maintained at 60–70° for 3 hours and is then cooled and with constant stirring acidified to pH 2.0 with dilute hydrochloride acid. The acidified mixture is stirred for one hour at 60° and is then filtered. The filtrate is evaporated at reduced pressure. The residual product is the free base 3-phenoxypropoxyamine. It can be used as such without purification. The hydrochloride salt, obtained by extracting the residue with ether, drying the ethereal solution and treating with excess hydrogen chloride, melts at 117–118° C.

(c) When a 50% methanolic solution of the free base product of paragraph (a) is treated with excess sulfuric acid (10% aqueous solution), the corresponding hemisulfate salt is obtained as the residue remaining after removal of solvent in vacuo. To convert the hemisulfate to the corresponding hydrochloride salt, an aqueous solution of 10 g. of the hemisulfate is passed over a column containing 60.0 g. of a strongly basic [Cl$^-$] ion exchange resin, the column is eluted with aqueous alcohol, and the eluant removed from the eluate under vacuum, thereby leaving the desired hydrochloride salt as the residual product.

The free base product can also be converted to addition salts with an organic acid. The acetate salt is produced by dissolving 5.0 g. of the free base in a 20% excess of 50% aqueous acetic acid and evaporating the solution to dryness under reduced pressure so as to leave the desired acetate salt as a solid residue. Similarly, the free base (5 g.) in ether (50 ml.) is converted to the benzoate salt by addition of an equivalent amount of benzoic acid in ether (10 ml.). The benzoate is isolated by removal of ether in vacuo. The salts are purified by recrystallization from methanol/ether.

I claim:

1. A chemical compound of the group of compounds consisting of 3-(p-fluorophenoxy)propoxyguanidine and its acid addition salts with pharmaceutically acceptable acids.

2. An acid addition salt compound according to claim 1.

3. A nitrate salt compound according to claim 1 which compound is 3 - (p - fluorophenoxy)prepoxyguanidine nitrate.

References Cited

UNITED STATES PATENTS 3,304,324   2/1967   Schumann _____ 260—501

FOREIGN PATENTS 640,150   5/1964   Belgium _____ 260—501.14

BERNARD HELFIN, Primary Examiner

G. A. SCHWARTZ, Assistant Examiner

U.S. Cl. X.R.

260—343.7, 501.14; 424—280, 316, 326